United States Patent
Huang et al.

(10) Patent No.: US 12,422,633 B2
(45) Date of Patent: Sep. 23, 2025

(54) LASER PRINTED LENSED OPTICAL FIBERS AND ASSOCIATED METHODS

(71) Applicant: CORNING RESEARCH & DEVELOPMENT CORPORATION, Corning, NY (US)

(72) Inventors: Jinxin Huang, Corning, NY (US); Ming-Jun Li, Horseheads, NY (US); Jie Liu, Painted Post, NY (US); Ying Liu, Painted Post, NY (US); Qi Wu, Painted Post, NY (US); Lei Yuan, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 340 days.

(21) Appl. No.: 18/149,252

(22) Filed: Jan. 3, 2023

(65) Prior Publication Data
US 2023/0168450 A1 Jun. 1, 2023

Related U.S. Application Data

(63) Continuation of application No. PCT/US2021/040683, filed on Jul. 7, 2021.
(Continued)

(51) Int. Cl.
*G02B 6/42* (2006.01)
*G02B 6/32* (2006.01)
*G02B 6/38* (2006.01)

(52) U.S. Cl.
CPC ............. *G02B 6/425* (2013.01); *G02B 6/327* (2013.01); *G02B 6/3853* (2013.01)

(58) Field of Classification Search
CPC ...... G02B 6/425; G02B 6/327; G02B 6/3853; G02B 6/06; G02B 6/262; G02B 6/3274
See application file for complete search history.

(56) References Cited

U.S. PATENT DOCUMENTS

| | | | | | |
|---|---|---|---|---|---|
| 5,563,969 A | * | 10/1996 | Honmou | ............... | G02B 6/2552 385/35 |
| 5,595,669 A | * | 1/1997 | Le Bris | ................ | G02B 6/2552 219/121.48 |

(Continued)

FOREIGN PATENT DOCUMENTS

| CN | 108398854 A | 8/2018 |
|---|---|---|
| EP | 3756037 A4 | 11/2021 |

(Continued)

OTHER PUBLICATIONS

"3M Expanded Beam Optical Patch Cord", Retrieved from: https://www.3m.com/3M/en_US/company-us/all-3m-products/~/3M-Expanded-Beam-Optical-Patch-Cord/?N=5002385+3289997724&rt=rud, 2023, 5 pages.

(Continued)

*Primary Examiner* — Tina Wong
(74) *Attorney, Agent, or Firm* — Kapil U. Banakar (57) ABSTRACT

The present disclosure relates to methods of assembling a lensed optical fiber array by printing in situ a lens onto each optical fiber of an optical fiber array with an ultrafast laser system where the lens can be shaped to the optical fiber end face to reduce pitch mismatch. In some embodiments, optical fiber(s) of the optical fiber array can be cleaved, and the lens can be shaped to the optical fiber end face to reduce pitch mismatch.

16 Claims, 7 Drawing Sheets

Related U.S. Application Data (60) Provisional application No. 63/053,466, filed on Jul. 17, 2020.

(56) References Cited

U.S. PATENT DOCUMENTS

| | | | | |
|---|---|---|---|---|
| 6,556,747 | B2* | 4/2003 | Ouali | G02B 6/4203 385/33 |
| 6,768,837 | B1* | 7/2004 | Thual | G02B 6/2552 385/115 |
| 7,474,821 | B2* | 1/2009 | Donlagic | G02B 6/262 385/35 |
| 9,746,620 | B2 | 8/2017 | Zhang et al. | |
| 10,007,062 | B2* | 6/2018 | Hodge | G02B 6/3855 |
| 10,514,512 | B2 | 12/2019 | Haase et al. | |
| 10,816,735 | B2 | 10/2020 | Cuno et al. | |
| 11,280,698 | B2 | 3/2022 | Huang et al. | |
| 11,543,599 | B2 | 1/2023 | Sutherland et al. | |
| 2002/0186922 | A1 | 12/2002 | Hananaka | |
| 2003/0016348 | A1 | 1/2003 | Sallee | |
| 2003/0174944 | A1 | 9/2003 | Dannoux et al. | |
| 2003/0215192 | A1* | 11/2003 | Durrant | G02B 6/421 385/85 |
| 2004/0131326 | A1 | 7/2004 | Miller et al. | |
| 2005/0069256 | A1* | 3/2005 | Jennings | G02B 6/262 385/33 |
| 2005/0244123 | A1 | 11/2005 | Hirao et al. | |

FOREIGN PATENT DOCUMENTS

| | | |
|---|---|---|
| KR | 10-2010-0083992 A | 7/2010 |
| WO | 2002/103424 A1 | 12/2002 |
| WO | 2003/008918 A2 | 1/2003 |
| WO | 2017/054683 A1 | 4/2017 |
| WO | 2019/165205 A1 | 8/2019 |

OTHER PUBLICATIONS

Childers et al., "New single-mode, multi-fiber, expanded-beam, passive optical interconnect," SPIE 2014, 13 pages.

Fan et al; "Nanoscale Metal Waveguide Arrays as Plasmon Lenses"; Optics Letters, 31, 2006, pp. 1322-1324.

Hofmann et al., "Fabrication of optical components with nm- to mm-scale critical features using three-dimensional direct laser writing," 2019 IEEE 16th International Conference on Smart Cities: Improving Quality of Life Using ICT & IoT and AI (HONET-ICT), Charlotte, NC, USA, 2019, pp. 213-216.

International Search Report and Written Opinion of the International Searching Authority; PCT/US2021/040683; dated Oct. 13, 2021; 16 pages; European Patent Office.

Yakabe et al., "Dust insensitive single mode multi fiber connector with expanded beam," OFC 2019, 3 pages.

* cited by examiner

LASER PRINTED LENSED OPTICAL FIBERS AND ASSOCIATED METHODS

PRIORITY APPLICATION

This application is a continuation of International Application No. PCT/US21/40683, filed on Jul. 7, 2021, which claims the benefit of priority to U.S. Application No. 63/053,466, filed on Jul. 17, 2020, both applications being incorporated herein by reference.

FIELD OF THE DISCLOSURE

This disclosure relates to assembling lensed optical fibers and more particularly, to assembling lensed optical fibers with a laser printing technique.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables.

Research and development in multi-fiber single-mode expanded beam (EB) or lensed interconnect components have experienced significant growth in recent years, driven by their potential applications in hyperscale data centers. One example application is in inter-building connectivity, which requires high fiber count cables. In particular, at the transition point inside the data center buildings, the outside plant cables are conventionally fusion spliced to indoor cables in the field, which is time consuming and expensive. Cables pre-terminated with high fiber count connectors can replace fusion splicing in the field and reduce the deployment time.

Compared with conventional physical contact single-mode interconnects, EB optical connectors (e.g., splicing of gradient index (GRIN) lens and single mode (SMF) fiber, lensed connectors) have many unique advantages, including reduced mating force, reduced need for maintenance, cleaning, less sensitive to the debris, and increased lateral alignment tolerance.

EB connectors for data center applications are already commercially available for multimode fibers. Multimode EB connectors can tolerate about 5 μm lateral positioning error between the optical fiber and the lens. For a single mode EB connection, the tolerance must be reduced to less than 1 μm to avoid excessive optical loss. Maintaining such an accuracy over a lensed (expanded beam) optical fiber array or a lensed optical fiber connector is difficult for injection molded lenses.

Previous approaches to adding lenses onto optical fiber arrays include using a lens array and building a fiber array separately. Then, subsequent processes involve actively aligning and permanently bonding the lens array and the fiber array. However, precisely matching the pitches between the fiber array and the lens array can be difficult due to different fabrication processes for the fiber array and the lens array.

SUMMARY OF THE DISCLOSURE

The present disclosure relates to methods of assembling a lensed optical fiber array by printing in situ a lens onto each optical fiber of an optical fiber array with an ultrafast laser system where the lens can be shaped to the optical fiber end face to reduce pitch mismatch. In some embodiments, optical fiber(s) of the optical fiber array can be cleaved, and the lens can be shaped to the optical fiber end face to reduce pitch mismatch.

In one embodiment, a method of fabricating a lensed array is provided. The method comprises: inserting a fiber array that comprises optical fibers into channels of a glass substrate such that a portion of the fiber array is within the glass substrate and uncovered; and printing in situ a lens onto each optical fiber of the fiber array via two photon polymerization (TPP) using an ultrafast laser system to form a lensed array; wherein a pitch mismatch between the lensed array and the fiber array is less than 0.1 μm.

In some embodiments, the ultrafast laser system is operated at a wavelength ranging between 500 nm and 1000 nm, a pulse width ranging between 90 fs and 150 fs, and a repetition rate of between 15 MHz and 100 MHz. In some embodiments, the ultrafast laser system is operated at a wavelength of 780 nm, a pulse width of 120 fs, and a repetition rate of 80 MHz. In some embodiments, the fiber array is a two dimensional fiber array. In some embodiments, the method further includes cleaving each optical fiber of the fiber array at an angle ranging between 0° and 8° relative to a plane perpendicular to a central axis of the optical fiber, wherein the angle has an angle variation of about 0.5°. In some embodiments, the method further includes printing a coating on each of the lenses, wherein the coating is selected from the group consisting of: acrylic-based resists, epoxy based resists, and positive and negative resists. In some embodiments, the method further comprises splicing a coreless fiber onto each optical fiber of the fiber array prior to printing the lens on the optical fiber. In some embodiments, the ultrafast laser system is operated at a wavelength of 800 nm, a pulse width of 300 fs, and a repetition rate of 80 MHz.

In one embodiment, a lensed connector is provided. The lensed connector comprises: a glass substrate comprising a plurality of channels; a fiber array comprising optical fibers inserted into the channels of the glass substrate, wherein each optical fiber of the at least one optical fiber has a cleaved end face at an angle ranging between 0° and 8° relative to a central axis of the optical fiber; at least one coreless fiber spliced onto the optical fibers of the fiber array; a lens applied onto each of the at least one coreless fiber or an end face of the optical fibers to create a lensed array, wherein a pitch mismatch between the lensed array and the fiber array is between 0.05 nm and 0.1 μm; wherein the lens is applied onto the at least one optical fiber by an ultrafast laser system via two photon polymerization; and wherein the lensed connector has an angular misalignment ranging between 0.1° and 0.5° when coupled to another lensed connector.

In some embodiments, the lens has a sag height ranging between at least 100 nm to 20 μm relative to an interface between the coreless fiber and the lens. In some embodiments, the lens has a height ranging between 10 μm and 600 μm relative to the end face of the at least one optical fiber. In some embodiments, the lens includes a resin selected from the group consisting of: acrylic-based resists, epoxy based resists, and positive and negative resists. In some embodiments, the resin has a refractive index ranging between 1.4 and 1.7.

In one embodiment, a method of assembling a lensed connector is provided. The method comprises: inserting a fiber array comprising optical fibers into channels of a glass substrate such that a portion of the fiber array is within the glass substrate and uncovered; determining the shape of a respective lens for each of the inserted optical fibers based on a pointing angle of each of the inserted optical fibers of the fiber array within the glass substrate relative to a reference fiber of the fiber array; and printing in situ the respective lens onto each end face of each optical fiber of the fiber array via two photon polymerization (TPP) using an ultrafast laser system to form a lensed array; wherein a pitch mismatch between the lensed array and the fiber array is between 0.05 nm and 0.1 µm.

In some embodiments, the lensed optical connector has an angular misalignment ranging between 0.1° and 0.5° when coupled to another lensed optical connector. In some embodiments, the ultrafast laser system is operated at a wavelength ranging between 500 nm and 1000 nm, a pulse width ranging between 90 fs and 150 fs, and a repetition rate of between 15 MHz and 100 MHz. In some embodiments, the ultrafast laser system is operated at a wavelength of 780 nm, a pulse width of 120 fs, and a repetition rate of 80 MHz. In some embodiments, the method further includes cleaving each optical fiber of the fiber array at an angle ranging between 0° and 8° relative to a plane perpendicular to a central axis of the optical fiber, wherein the angle has an angle variation of about 0.5°. In some embodiments, the method further includes printing a coating on the lens, wherein the coating is selected from the group consisting of: acrylic-based resists, epoxy based resists, and positive and negative resists. In some embodiments, the method further comprises splicing a coreless fiber onto each optical fiber of the fiber array prior to printing the lens on the optical fiber. In some embodiments, the fiber array is a two-dimensional fiber array. In some embodiments, the ultrafast laser system is operated at a wavelength of 800 nm, a pulse width of 300 fs, and a repetition rate of 80 MHz.

In one embodiment, a lensed optical fiber connector formed by the method is provided. The method comprises: inserting a fiber array that comprises optical fibers into channels of a glass substrate such that a portion of the fiber array is within the glass substrate and uncovered; and printing in situ a lens onto each optical fiber of the fiber array via two photon polymerization (TPP) using an ultrafast laser system to form a lensed array; wherein the lensed optical fiber includes a coreless fiber spliced onto the optical fiber, wherein the coreless fiber is positioned between the lens and the at least one optical fiber; wherein the lens has a height ranging between 10 µm and 600 µm relative to end faces of the optical fibers; wherein the lensed array and the fiber array have a pitch mismatch of between 0.05 nm and 0.1 µm; and wherein the lensed optical fiber connector has an angular misalignment is less than 0.01° when coupled to another lensed optical fiber connector.

In some embodiments, the fiber array is a two dimensional fiber array. In some embodiments, the lens includes a resin selected from the group consisting of: acrylic-based resists, epoxy based resists, and positive and negative resists. In some embodiments, the lensed optical fiber connector further comprises a coating printed on each lens of the lens array, wherein the coating is selected from the group consisting of: acrylic-based resists, epoxy based resists, and positive and negative resists. In some embodiments, each optical fiber of the fiber array is cleaved at an angle ranging between 0° and 8° relative to a plane perpendicular to a central axis of the optical fiber, wherein the angle has an angle variation of about 0.5°.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be clarified by examples in the description below. In general, the present disclosure relates to methods of assembling a lensed optical fiber array by printing in situ a lens onto each optical fiber of an optical fiber array with an ultrafast laser system where the lens can be shaped to the optical fiber end face to reduce pitch mismatch. In some embodiments, optical fiber(s) of the optical fiber array can be cleaved, and the lens can be shaped to the optical fiber end face to reduce pitch mismatch.

Figures 1A, 1B:
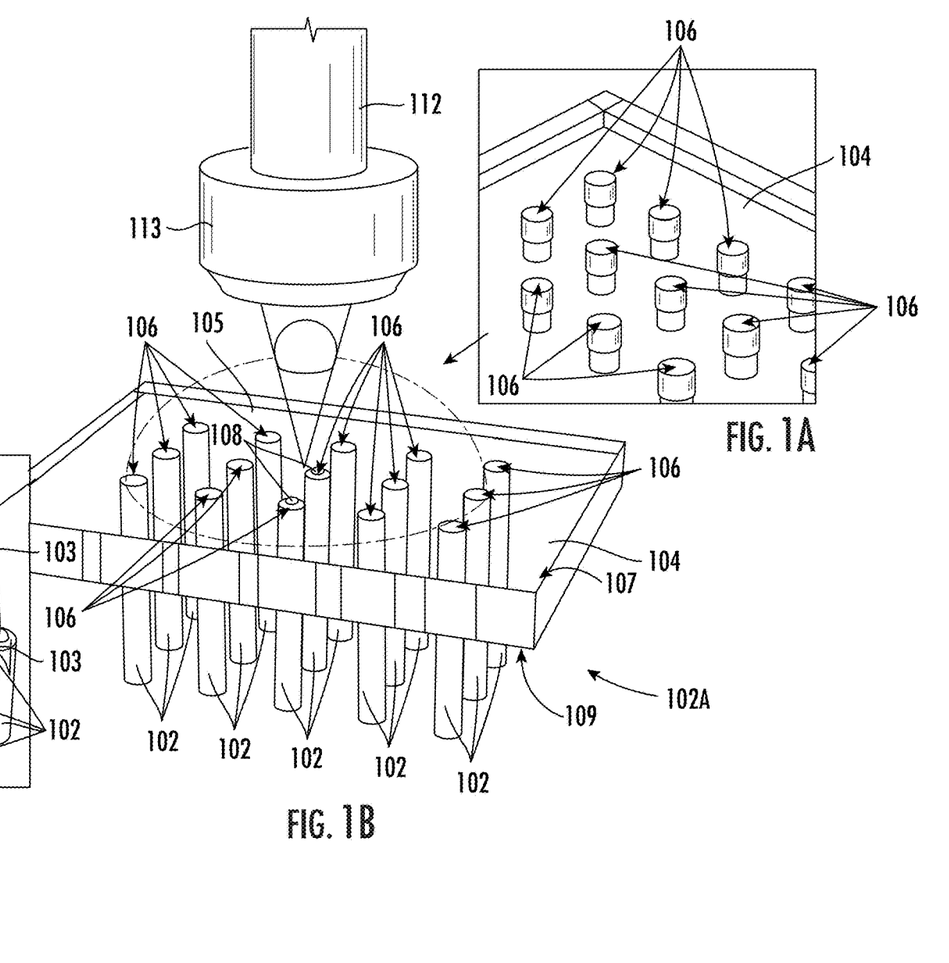
FIGS. 1A-1C are perspective views of an apparatus used to assemble lensed optical fiber arrays in accordance with the present disclosure.
Figure 1C:
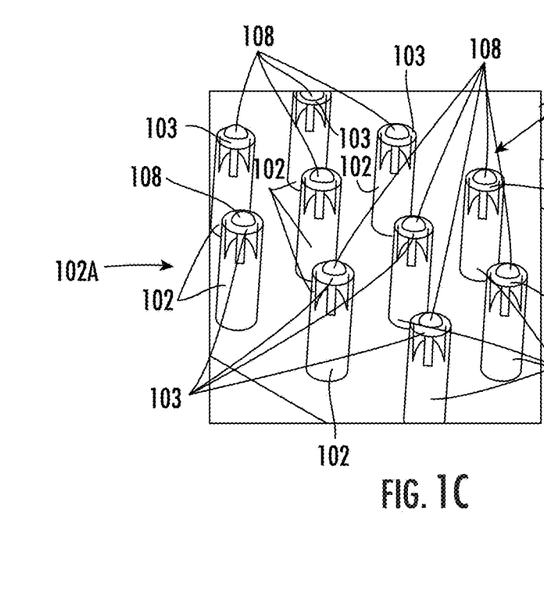

Referring first to FIGS. 1A-1C, a lens assembly apparatus 100 (FIG. 1B) is shown. Lens assembly apparatus 100 includes glass substrate 104, a photoresist 105, and laser 112. Glass substrate 104 is configured to receive optical fibers 102 of an optical fiber array 102A as shown in FIG. 1B and lens 108 as discussed in greater detail below. In particular, as shown in FIG. 1A, glass substrate 104 includes channels 106 extending throughout the thickness/body of glass substrate 104. Channels 106 are configured to receive optical fiber 102 from below bottom surface 104B and are configured to receive lens 108 (emitted from laser 112) from above top surface 104A. Stated another way, optical fiber 102 is partially inserted into channels 106 such that an end face 103 of optical fiber 102 is recessed within channel 106, and as discussed in greater detail below, lens 108 is printed onto optical fiber 102. To create channels 106 in glass substrate 104, glass substrate 104 is subjected to laser irradiation which is followed by etching via processes known in the art. Glass substrate 104 has a coefficient of thermal expansion (CTE) matching with optical fibers 102.

As shown in FIG. 1B, a photoresist 105 is applied onto glass substrate 104. In particular, photoresist 105 is applied on top of optical fiber array 102A within glass substrate 104. In some embodiments, optical fiber array 102A is polished within glass substrate 104 prior to the application of photoresist 105 onto end faces of optical fiber array 102A. Photoresist 105 is configured to focus laser beam 120 of laser 112 onto end faces 103 of optical fibers 102 of optical fiber array 102A due to the non-linear effect and to initiate two photon polymerization discussed below.

As shown in FIG. 1B, laser 112 is positioned above glass substrate 104 such that laser 112 can emit a laser beam 120 to 3D print lens 108 onto end face 103 of optical fiber 102 as discussed herein. In some embodiments, lens 108 is printed onto end face 103 of optical fiber 102 via a layer by layer application. In some embodiments, laser 112 is an ultrafast laser as discussed in greater detail below. However, it is contemplated that in alternate embodiments, a different suitable type of laser may be used. Laser 112 includes an objective lens 113. In some embodiments, objective lens 113 has an objective lens range between 50× and 75×, between 55× and 70×, or between 60× and 65×. In one embodiment, objective lens 113 has an objective lens of about 63×. In some embodiments, objective lens 113 has a numerical aperture (NA) ranging between 1 and 5, between 1 and 3, or between 1 and 2.5. In one embodiment, the numerical aperture of objective lens 113 is about 1.4.

Laser 112 has a range of operating parameters in the context of the present disclosure. In some embodiments, laser 112 emits a laser beam at a pulse width between 90 femtoseconds (fs) and 150 fs, 100 fs and 140 fs, or 110 fs and 130 fs. In one embodiment, the pulse width of a laser beam emitted from laser 112 is 120 fs. In some embodiments, laser 112 emits a laser beam at a repetition rate ranging between 15 megahertz (MHz) and 100 MHz, between 20 MHz and 95 MHz, or between 25 MHz and 90 MHz. In one embodiment, laser 112 emits a laser beam at a repetition rate of 80 MHz. In some embodiments, laser 112 emits laser beam 120 at an output power ranging between 1 milliwatt (mW) and 300 mW, between 50 mW and 200 mW, or between 75 mW and 100 mW with a corresponding actual laser energy of about 1 nanojoule (nJ) per pulse. In one embodiment, laser 112 emits laser beam 120 at an output power of 80 mW with a corresponding actual laser energy used for perforating an optical fiber of about 1 nJ per pulse. In some embodiments, laser 112 emits a laser beam 120 at a wavelength ranging between 500 nanometers (nm) and 1000 nm, between 600 nm and 900 nm, or between 700 nm and 800 nm. In one embodiment, laser 112 emits a laser beam at a wavelength of 780 nm.

Figure 2:
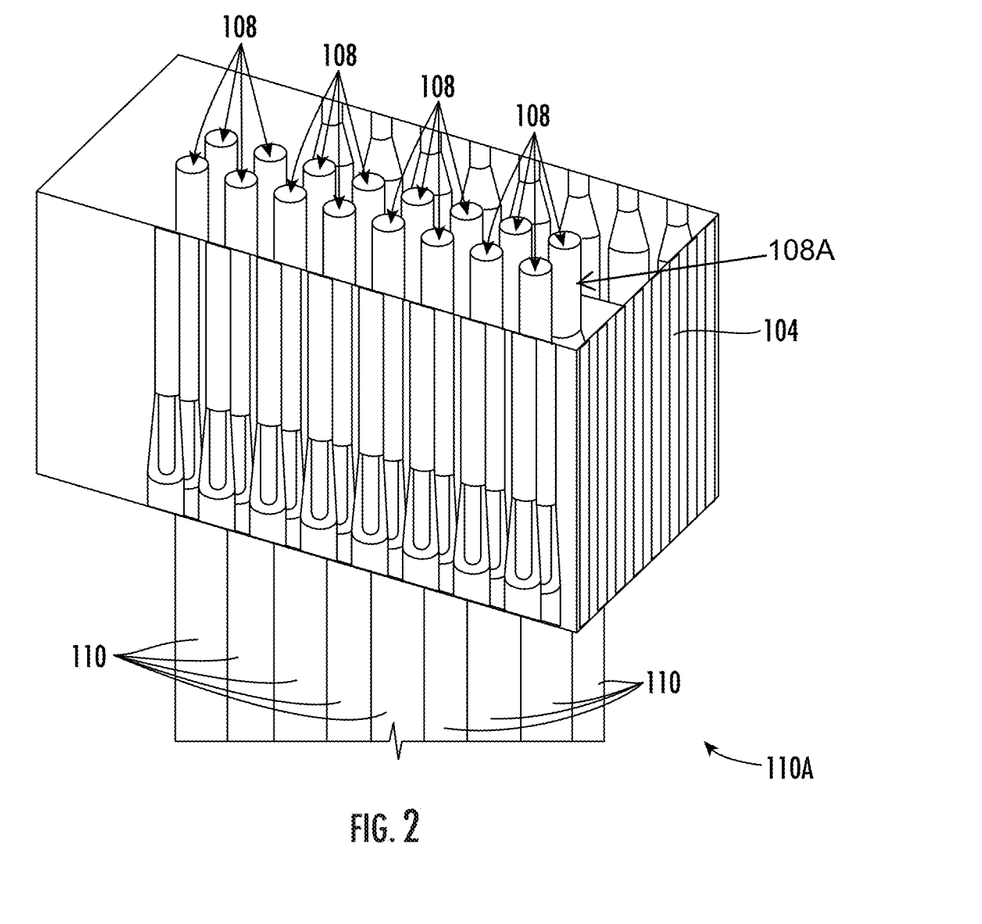
FIG. 2 is a perspective view of an assembled glass substrate in which assembled lensed optical fiber arrays are housed after undergoing assembly in accordance with the present disclosure.

To assemble a lensed optical fiber array 110A (FIG. 1C), optical fibers 102 of optical fiber array 102A are inserted into channels 106 through bottom side 109 such that a portion of optical fiber 102 is within glass substrate 104. In some embodiments, optical fiber array 102A is a two-dimensional array. However, it is within the scope of the present disclosure that optical fiber array 102A can have other suitable array configurations, such as a one-dimensional fiber array, for example. Then, laser 112 emits a laser beam into channels 106 (through top side 107) and onto end face 103 of optical fiber 102 such that a lens 108 is printed onto end face 103 of optical fiber 102 resulting in the assembly shown in FIG. 2. In some embodiments, lens 108 is deposited onto end face 103 of optical fiber 102 by two photon polymerization (TPP). TPP is a precision direct-writing polymer-based fabrication technology. TPP provides "printing" micron-to-mm sized components with nanoscale precision directly from CAD-generated design files. Polymerization is initiated with simultaneous absorption of two photons by a photo-initiator in a reactive monomer/oligomer resin and thus depends on the square of the laser irradiance of laser beam 120 emitted from laser 112. Because two photon absorption cross-sections are low, the probability of reaction initiation is negligible except near the focus of laser beam 120. Stated another way, the TPP process initiates polymerizate only at the peak of the focal irradiance profile of laser beam 120. Therefore, it is possible to achieve resolution beyond the diffraction limit. That is, the flexibility and high spatial resolution of TPP produces almost arbitrary large-curvature optical quality surfaces in an additive and tool-free way as discussed below. In particular, laser beam 120 is emitted from laser 112, and laser beam 120 is focused onto end face 103 of optical fiber 102 by photoresist 105 due to the non-linear effect, which enables formation of high precision, high resolution 3D structures inside photoresist 105. Then, the optical fiber sample (optical fibers 102 of optical fiber array 102A) is developed and resinsed to form a microlens array 108 onto optical fiber array 102A.

In alternate embodiments, a photoresist 105 is applied onto a bottom side 109 of glass substrate 104, and optical fibers 102 are inserted into channels 106 via top side 107 of glass substrate 104. Laser 112 then prints lens 108 onto end face 103 of optical fiber 102 by emitting a laser beam into channels 106 through bottom side 109 and photoresist 105.

In some embodiments, laser 112 emits a laser beam at a wavelength of 780 nm, a repetition rate of 80 MHz, and a pulse width of 120 fs. After lens 108 is deposited onto end face 103, glass substrate 104 is removed to form lensed optical fibers 110 of lensed optical fiber array 110A.

Figure 3A:
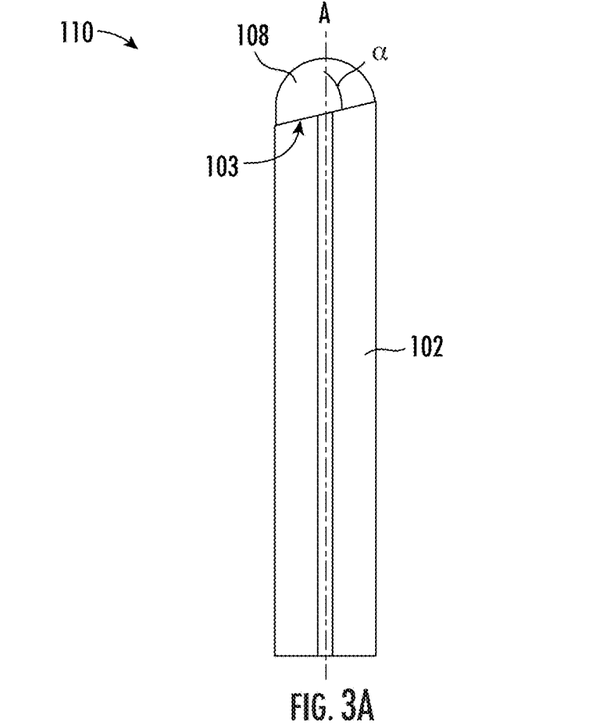
FIG. 3A is a cross sectional view showing the lens printed onto an optical fiber of the optical fiber array.
Figure 4:
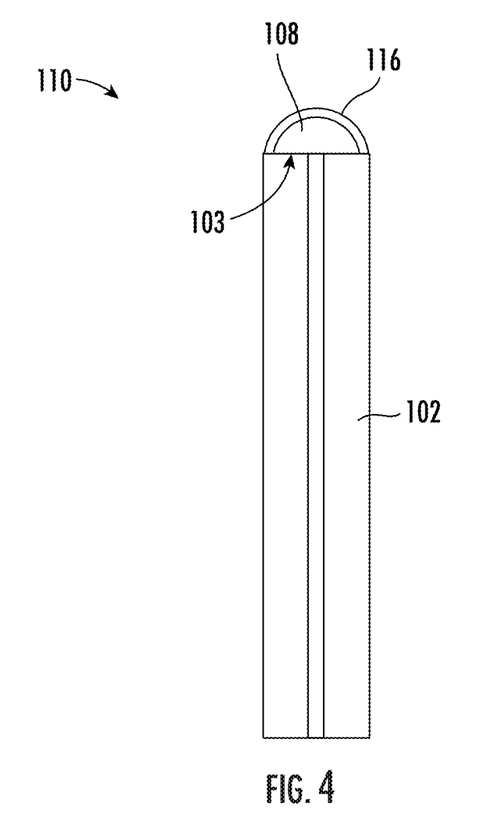
FIG. 4 is a cross sectional view showing the lens printed onto an optical fiber of the optical fiber array where the lens has an additional coating thereon.
Figure 5:
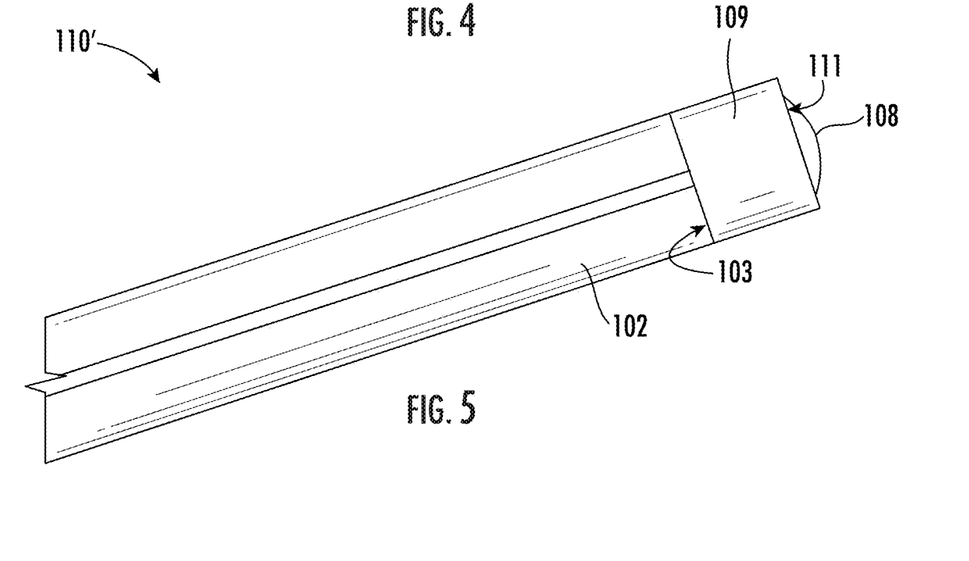
FIG. 5 is a side view of an alternate configuration of a lensed optical fiber of the lensed optical fiber array.

Referring now to FIGS. 3A, 4, 5, various embodiments of lensed optical fiber 110 are shown. In general, lensed optical fiber 110 includes optical fiber 102 and lens 108 applied onto end face 103 of optical fiber 102 (by laser 112 as discussed in the method above). In some embodiments, optical fiber 102 is a single mode optical fiber. However, it is within the scope of the present disclosure that other types of suitable optical fibers, such as multimode optical fibers, may be used. As shown in FIGS. 3A, 4, and 5, optical fibers 102 include end face 103 onto which lens 108 is applied. In some embodiments, end face 103 is cleaved prior to insertion into glass substrate 104. As shown in FIG. 3A, optical fiber 102 is cleaved and has a cleave angle α relative to central axis A. Stated another way, optical fiber 102 is cleaved and has a cleave angle α relative to a plane perpendicular to central axis A. In some embodiments, cleave angle α ranges between 0° and 8° with an angle variation of about 0.5°.

As mentioned previously in the method above, lens 108 is applied onto end face 103 of optical fiber 102 by laser 112. In some embodiments, lens 108 is made of a polymerizable material that may generally include monomers, photoinitiators, and stabilizers. In some embodiments, lens 108 is selected from the group consisting of: acrylic-based resists, epoxy based resists, and positive and negative resists. In general, lens 108 includes both positive and negative resists prone to polymerization upon supplying energy via laser radiation. In some embodiments, the resin has low shrinkage and a viscosity ranging between 1 mPa s and 20,000 mPa s, or between 50 mPa s and 15,000 mPa s, or between 1000 mPa s and 15,000 mPa s. In some embodiments, the resin has a refractive index ranging between 1.4 and 1.7. In some embodiments, the resin has a refractive index of about 1.6.

Referring now to FIG. 4, in some embodiments, a coating 116 can be applied onto lens 108 of lensed optical fiber 110. Coating 116 is applied onto lens 108 using laser 112 via two photon photolithography. Coating 116 is an anti-reflective coating. In some embodiments, coating 116 is an antireflective coating, and similar to lens 108, coating 116 is made of a polymerizable material that may generally include monomers, photoinitiators, and stabilizers. In some embodiments, coating 116 is selected from the group consisting of: acrylic-based resists, epoxy based resists, and positive and negative resists. In general, coating 116 includes both positive and negative resists prone to polymerization upon supplying energy via laser radiation.

Referring now to FIG. 5, an alternate embodiment of a lensed optical fiber 110' is shown. Lensed optical fiber 110' has substantially the same configuration as lensed optical fiber 110 except as noted below. As shown, a coreless fiber 109 is positioned between optical fiber 102 and lens 108. Stated another way, a coreless fiber 109 is spliced onto optical fiber 102 such that coreless fiber 109 contacts end face 103 of optical fiber 102. In particular, coreless fiber 109 is spliced onto end face 103 of optical fiber 102; then, coreless fiber 109 is cleaved to a desired length on optical fiber 102. In some embodiments, coreless fiber 109 is printed onto end face 103 of optical fiber 102 by TPP as discussed above after which coreless fiber 109 is cleaved to a desired length. The presence of coreless fiber 109 expands the mode field diameter of optical fiber 102. Lens 108 is then applied onto end face 111 of coreless fiber 109 via the methods described below. In some embodiments, coreless fiber 109 is made of substantially the same materials of respective claddings of optical fibers 102 of optical fiber array 102A. In some embodiments, coreless fiber 109 has a refractive index of about 1.44 at a reference wavelength of 1550 nm.

Figure 3B:
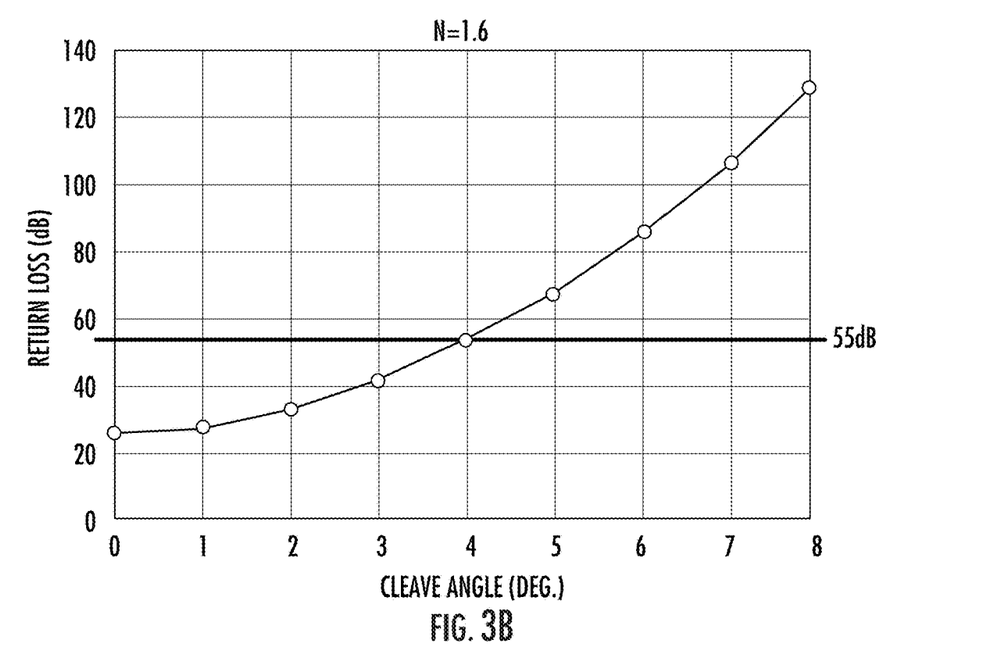
FIG. 3B is a graph showing the variation of return loss in relation to the cleave angle of the lensed optical fiber of FIG. 3A.

Lensed optical fibers 110, 110' are configured to be installed into optical fiber connectors (not shown). In some embodiments, optical fiber connectors have a return loss requirement of 55 decibels (dB). Referring now to FIG. 3B, optical fiber connectors with lensed optical fiber 110 (FIG. 3A) with lens 108 having a refractive index of about 1.6 have varying return loss data based on the cleave angle α of optical fiber 102. As shown, optical fiber 102 of lensed optical fiber 110 can have a cleave angle of about 5° or more.

In some embodiments, lens 108 of lensed optical fibers 110, 110' have a lens height ranging between 10 μm and 700 μm, between 15 μm and 650 μm, or between 15 μm and 600 μm based on an expanded mode field diameter of optical fiber 102 (e.g., of about 74 μm to −75 μm). In some embodiments, the lens height of lens 108 as applied onto optical fiber 102 or coreless fiber 109 is about 596 μm and about 16 μm, respectively. As used herein, "lens height" or "height" refers to the height of lens 108 (based on apex of lens 108) relative to end face 103. For example, in FIG. 5, lens height is measured from end face 103 to the apex of lens 108 and includes coreless fiber 109. Similarly, in embodiments where coreless fiber 109 is not present (e.g., FIG. 4), lens height is measured from end face 103 to the apex of lens 108.

In some embodiments, lens 108 of lensed optical fibers 110, 110' have a sag height ranging between at least 100 nm and about 20 μm. As used herein, "sag height" refers to the distance from the apex of lens 108 to the surface onto which lens 108 is applied. For example, in FIG. 5, the sag height of lens 108 would be the distance between the apex of lens 108 to end face 111 onto which lens 108 is applied. Similarly, in embodiments where coreless fiber 109 is not present (e.g., FIG. 4), sag height is the distance from the apex of lens 108 to end face 103 of optical fiber 102.

In some embodiments, lensed optical fibers 110, 110' have a pitch among other lensed optical fibers of lensed optical fiber array 110A ranging between 50 μm and 300 μm, between 75 μm and 275 μm, or between 80 μm and 250 μm. In some embodiments, the pitch of lensed optical fiber array 110A is about 250 μm for optical fibers 102 or about 130 μm to 180 μm for thin coated optical fibers 102. As used herein, "pitch" refers to the distance between the centers of optical fibers 102 of optical fiber 102A. Pitch can also refer to the distance between the centers of lenses 108 of lens array 108A.

In some embodiments, lens 108 of lensed optical fibers 110, 110' have a pitch mismatch relative to end face 103 of optical fiber 102 ranging between 0.02 nm and 0.25 μm, between 0.03 nm and 0.2 μm, or between 0.05 nm and 0.1 μm. In some embodiments, the pitch mismatch is about 0 nm or in some alternate embodiments, the pitch mismatch is about ±100 nm. As used herein, "pitch mismatch" refers to the difference between the pitch of a lens array 108A (FIG. 2) and the pitch of optical fiber array 102A.

Figure 6:
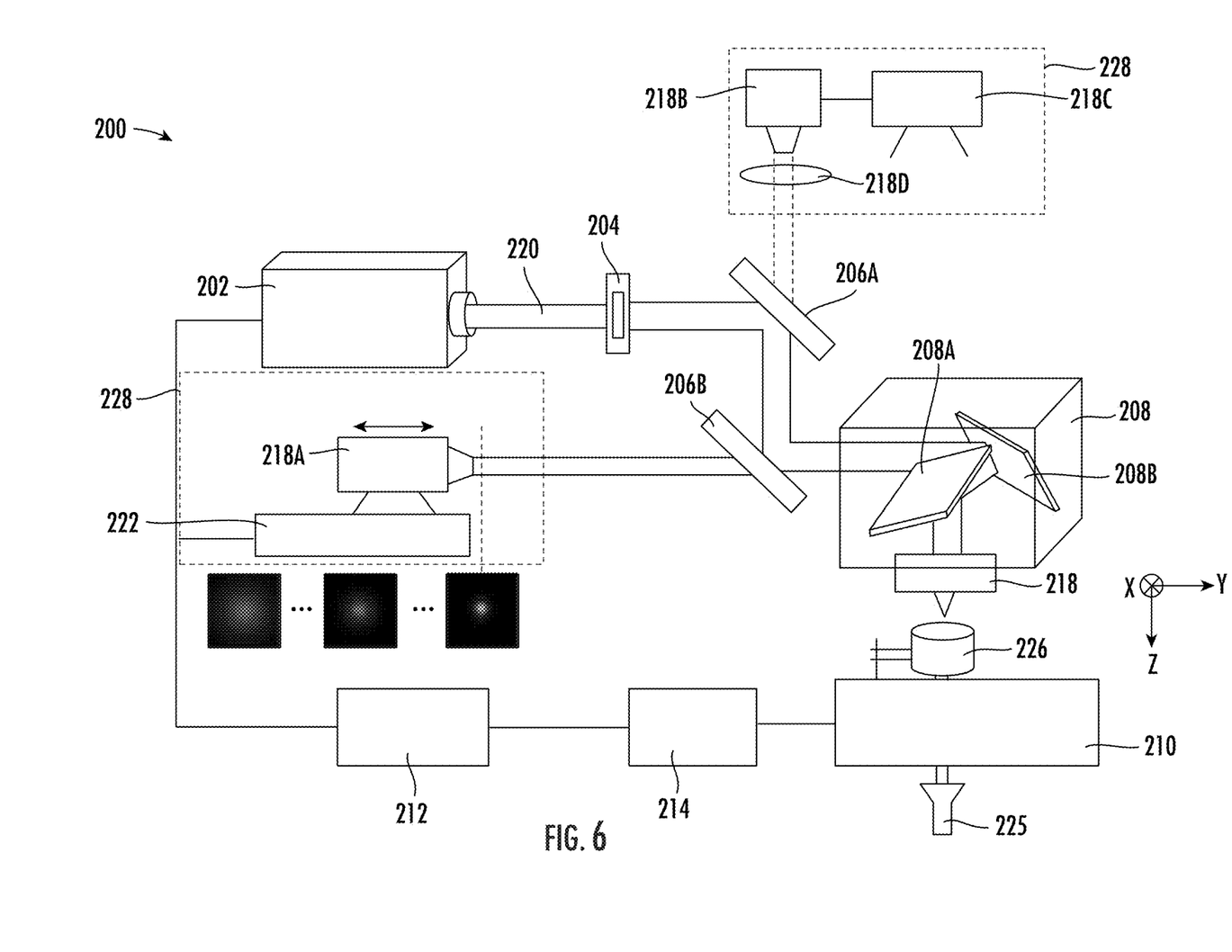
FIG. 6 is a schematic of an alternate lens assembly apparatus in accordance with the present disclosure.

Referring now to FIG. 6, an alternate lens assembly apparatus 200 is shown. Lens assembly apparatus 200 is configured to apply lens(es) 108 onto optical fibers 102 of optical fiber array 102A based on characteristics of optical fibers 102 as discussed herein.

Lens assembly apparatus 200 includes a laser 202, a shutter 204, a camera 218A, a series of reflecting mirrors 206A, 206B, a Galvoscanner 208, and a stage 210. As shown in FIG. 6, laser 202 emits a laser beam 220 (upon direction from computer 212 and/or driver 214 as discussed below) in the y-direction of the Cartesian coordinate system as defined in the Figure. Laser beam 220 has a wavelength in the range of 500 nanometers (nm) and 2000 nm, 600 nm and 1700 nm, or 700 nm and 1400 nm. In one embodiment, laser beam 220 has a wavelength of 800 nm. In some embodiments, laser 202 is an ultrafast laser. However, it is contemplated that in alternate embodiments, a different suitable type of laser may be used. In some embodiments, laser 202 emits laser beam 220 at a pulse width between 100 femtoseconds (fs) and 500 fs, between 150 fs and 450 fs, or between 200 fs and 400 fs. In one embodiment, the pulse width of laser beam 220 emitted from laser 202 is 300 fs. In some embodiments, laser 202 emits laser beam 220 at a repetition rate ranging between 25 megahertz (MHz) and 200 MHz, between 35 MHz and 150 MHz, or between 50 MHz and 100 MHz. In one embodiment, laser 202 emits laser beam 220 at a repetition rate of 80 MHz. In some embodiments, laser 202 emits laser beam 220 at an output power ranging between 1 milliwatt (mW) and 300 mW, between 50 mW and 200 mW, or between 75 mW and 100 mW with a corresponding actual laser energy of about 1 nanojoule (nJ) per pulse. In one embodiment, laser 202 emits laser beam 220 at an output power of 80 mW with a corresponding actual laser energy used for perforating an optical fiber of about 1 nJ per pulse.

As mentioned previously, laser beam 220 passes through shutter 204. Shutter 204 is configured to control the exposure of laser beam 220 to the remainder of lens assembly apparatus 200. When shutter 204 is opened, laser beam 220 passes through shutter 204 and moves to reflecting mirrors 206A, 206B.

Reflecting mirrors 206A, 206B are configured to reflect laser beam 220 in a different direction than the direction when emitted by laser 202. As shown, reflecting mirror 206A reflects laser beam 220 such that laser beam 220 moves in a direction that is substantially perpendicular (or orthogonal) relative to the previous direction, and reflecting mirror 206B reflects reflected laser beam 220 (from reflecting mirror 106A) in a direction that is substantially parallel to the original direction when emitted by laser 202 and into galvoscanner 208. Stated another way, as shown in FIG. 6, laser beam 220 is moving in the y-direction and upon contacting reflecting mirror 106A, laser beam 220 moves in the z-direction until contacting reflecting mirror 106B where laser beam 220 moves in the y-direction into galvoscanner 208. In alternate embodiments, other various angle reflections may be possible relative to the incoming direction via reflecting mirrors 106A, 106B. In some embodiments, reflecting mirrors 106A, 106B are dichroic mirrors. However, it is within the scope of the present disclosure that other suitable types of mirrors may be used.

Laser beam 220 then proceeds to galvoscanner 208. Galvoscanner 208 is configured to direct laser beam 220 onto optical fiber 102 during the fabrication process discussed below. Galvoscanner 208 is a two-axis galvanometer scanner that includes at least two mirrors 208A, 208B and an objective lens 218 between mirrors 208A, 208B. Mirrors 208A, 208B are moved along the x-y plane of FIG. 6 such that mirrors 208A, 208B can deflect laser beam 220 to any position along sample 226 (i.e., optical fibers 102 of optical fiber array 102A). Objective lens 218 is configured to focus laser beam 220 onto sample 226 after laser beam 220 has been deflected off mirrors 208A, 208B.

Figure 8:
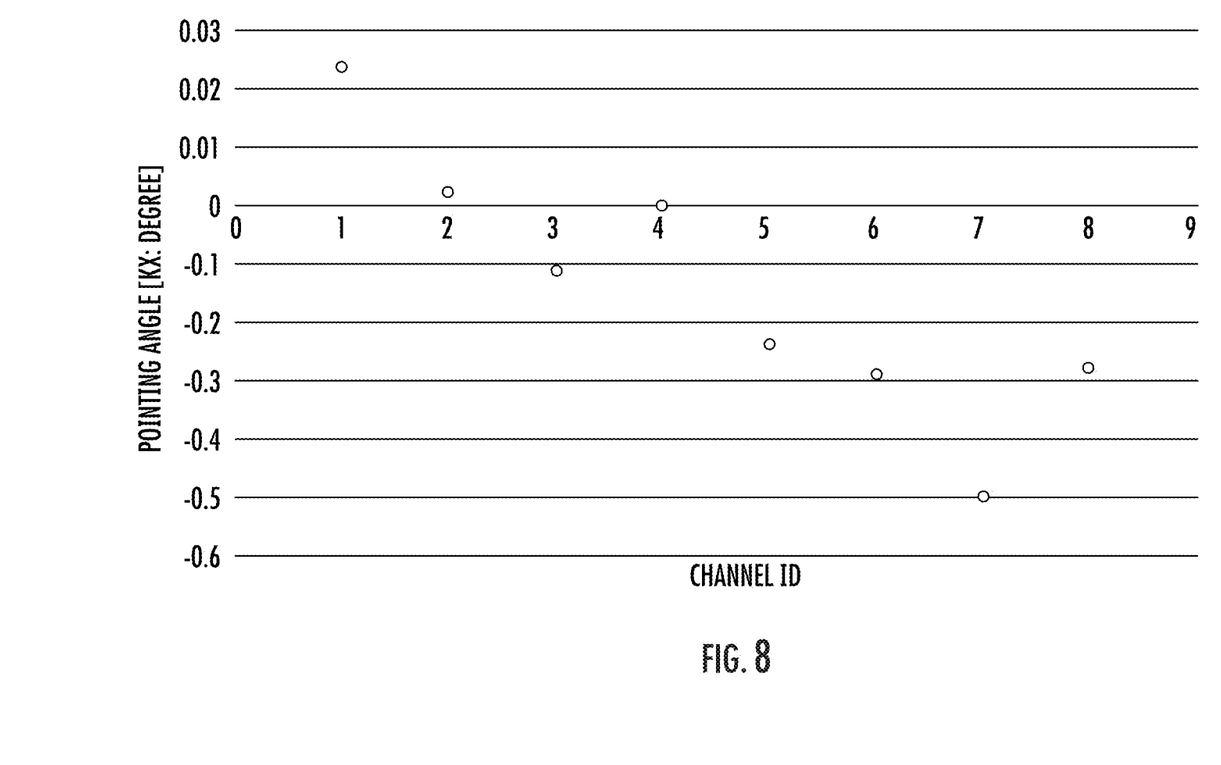
FIG. 8 is a graph illustrating varying pointing angles among optical fibers in an example optical fiber array.

Imaging system 228 includes a camera 218A and a charge coupled device (CCD) 218B, a monitor 218C, and an imaging lens 218D. Camera 218A is configured to generate far field images of a light intensity profile of sample 226. The far field images generated by camera 218A enable measurement of a pointing angle of each optical fiber 102 of optical fiber array 102A (e.g., two-dimensional optical fiber array 102A) prior to application of lens 108 onto optical fibers 102 when placed on stage 210 as discussed herein. In particular, camera 218A cooperates with CCD 218B, imaging lens 218D, and reflecting mirrors 206A, 206B to generate images of sample 226 onto monitor 218C. In alternate embodiments, a non-contact far field measurement setup can be integrated into laser system or laser 202 to measure a pointing angle of each optical fiber 102 of optical fiber array 102A (e.g., two-dimensional optical fiber array 102A) prior to application of lens 108 onto optical fibers 102 when placed on stage 210. As used herein, "pointing angle" refers to the relative orientation of a light beam emitted from an optical fiber channel with respect to a reference optical fiber. In some embodiments, the reference optical fiber is the optical fiber in the middle reference channel. Referring briefly to FIG. 8, a distribution of pointing angles are shown where the reference optical fiber is shown as the optical fiber in channel four. The distribution of pointing angles are due to the tolerance from micro-holes (e.g., channels 106 of glass substrate 104) and attributes of optical fibers 102. In connection with imaging system 228, the far field measurement capability of imaging system 228 described above can monitor the pointing angle during the assembly process, and the shape of lens 108 can be adjusted to accommodate the different pointing angles of optical fiber array 102A.

Camera 218A is a far field camera that is positioned on a single axis stage 222. Single axis stage 222 controls the positioning of camera 218A (along the y-axis as shown in FIG. 6) to adjust the clarity of the generated images of optical fibers 102 of optical fiber array 102A (i.e., sample 226). Single axis stage 222 is operably connected to computer 212 and driver 214 such that computer 212 provides instructions to driver 214, and driver 214 moves single axis stage 222 according to such instructions. In this way, the clarity of the generated images of optical fibers 102 of optical fiber array 102A. In one embodiment, the velocity of single axis stage 222 is about 20 mm/s.

CCD 218B, monitor 218C, and imaging lens 218D also generate images of optical fiber 102 of optical fiber array 102A (sample 226). In particular, CCD 218B, monitor 218C, and imaging lens 218D generate images of end face 103 of optical fiber 102 of optical fiber array 102A to provide measurements regarding the shape and angle of end face 103 such that the shape of lens 108 can be adjusted as appropriate prior to application of lens 108 onto end face 103. In some embodiments, when sample 226 is placed onto stage 210, both camera 218A and CCD 218B, monitor 218C, and imaging lens 218D generate images of the light intensity profile and end face 103 of optical fiber 102, respectively, prior to application of lens 108 onto end face 103.

As mentioned previously, sample 226 is placed onto stage 210 of apparatus 200. As shown, stage 210 is below galvoscanner 208 and above illumination system 225. Stage 210 is configured to move sample 226 such that sample 226 is in alignment with galvoscanner 208, mirrors 208A, 208B, and objective lens 218 to receive laser beam 220 onto optical fibers 102 of optical fiber array 102A (sample 226). In some embodiments, stage 210 is a three axis stage that is configured to move in any of the x, y, and z directions as defined in FIG. 6. However, it is within the scope of the present disclosure that alternate suitable stages may be used, such as a two-axis stage, for example. Computer 212 and driver 214 operate to move stage 210 along any of the x, y, and z directions during operation of apparatus 200. In one embodiment, stage 210 has a velocity of about 20 mm/s.

Illumination system 225 is provided below stage 210 as shown in FIG. 6. Illumination system 225 is configured to provide light onto stage 210 and sample 226 such that proper imaging of sample 226 can be completed by imaging system 228. Illumination system 225 is also configured to provide light onto stage 210 and sample 226 such that lens 108 can be accurately applied onto optical fibers 102 of optical fiber array 102A thereby, reducing angular misalignments between lensed connectors. In some embodiments, illumination system 225 is a white light. In alternate embodiments, illumination system is a laser emitting diode (LED) light or a laser source operated at either 1310 nm or 1550 nm. It is within the scope of the present disclosure that alternate suitable illumination systems may be used.

To operate apparatus 200 and create lensed optical fiber 110, 110' and lensed optical fiber array 110A, sample 226 is placed onto stage 210. As mentioned previously, sample 226 includes an optical fiber array 102A. In some embodiments, sample 226 is a two dimensional optical fiber array 102A. However, it is within the scope of the present disclosure that sample 226 may include other types of optical fiber array arrangements, such as a one-dimensional optical fiber array. Once sample 226 is placed onto stage 210, computer 212 operates to move single axis stage 222, and camera 218A is operated to generate images of light intensity profiles of an optical fiber 102 of optical fiber array 102A (sample 226). The images generated for optical fiber 102 enable calculations of a pointing angle of the core of optical fiber 102 relative to the bore of the glass substrate 104 (e.g., ferrule) in which optical fiber 102 is housed. After receiving the pointing angle measurement, the shape (curvature) of lens 108 is adjusted accordingly to minimize angular misalignment when coupling lensed connectors having lens 108 applied onto optical fiber 102. Also, CCD 218B, monitor 218C, and imaging lens 218D generate images of end face 103 such that the shape and angle of end face 103 can be determined and the shape of lens 108 can be adjusted accordingly.

Once the pointing angle and the shape of end face 103 are determined, computer 212 operates laser 202 to emit laser beam 220 and to print lens 108 onto end face 103 of optical fiber 102 thereby, creating lensed optical fiber 110, 110'. In this way, by measuring and compensating for the pointing angle of each optical fiber 102 of optical fiber array 102A and surface profile (shape and angle) of end face 103, angular misalignment between coupled lensed connectors having lens 108 and optical fibers 102 of optical fiber arrays 102A can be minimized and loss performance is thereby improved. In some embodiments, the angular misalignment between lensed connectors ranges between 0.1° and 0.5°. In some embodiments, the angular misalignment between lensed connectors is less than 0.1°. In some embodiments, the angular misalignment between lensed connectors is less than 0.01°.

After application of lens 108, stage 210 moves sample 226 such that another optical fiber 102 of optical fiber array 102A (sample 226) is centered and positioned under galvoscanner 208 to receive lens 108 onto end face 103 based on the respective pointing angle of the optical fiber 102. The process is repeated until all optical fibers 102 become lensed optical fibers 110, 110' to form lensed optical fiber array 110A.

Once lensed optical fibers 110, 110' are created, lensed optical fibers 110, 110' can be inserted into a ferrule (if lensed optical fibers 110, 110' were not already in a ferrule during the lens preparation and application processes described above).

Figure 7:
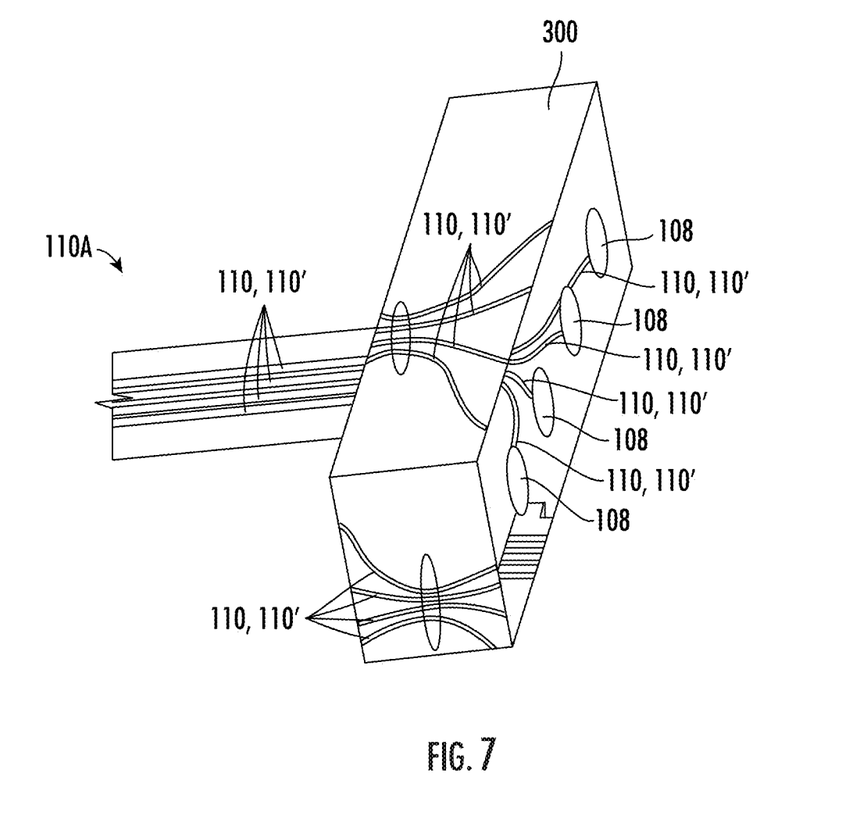
FIG. 7 is a perspective view of a ferrule with a lensed optical fiber array inserted into the ferrule in accordance with the present disclosure.

It is within the scope of the present disclosure that the above methods can be applied to optical fibers 102 that are already positioned in a ferrule 300 as shown in FIG. 7. FIG. 7 shows an expanded fanout multicore fiber ferrule 300 (hereinafter referred to as "ferrule 300"). As shown, ferrule 300 receives four optical fibers 102 of optical fiber array 102A. Lenses 108 are printed onto optical fibers 102 by the methods described above (laser lithography) in the present disclosure to create a lensed optical fiber array 110A (of lensed optical fibers 110, 110') within ferrule 300. In some embodiments, core bridges are printed onto end faces (not shown) of optical fibers 102 and then lens 108 are printed onto core bridges by laser lithography as described above.

Advantageously, the methods of the present disclosure provide a straightforward, efficient, and precise way to make lensed optical fibers 110, 110', lensed optical fiber arrays 110A, and lensed optical fiber connectors (lensed optical fiber arrays in a ferrule). In particular, because lasers 112, 202 can deposit precise laser energy to a target location, the laser induced polymerization can possess uniform surface feature or roughness of lens 108, precise lens shape and curvature of lens 108, ultra-low positioning error with the help of high precision motorized stages 210, 222, minimized pitch error between lenses 108 and optical fiber array 102A, and flexible process for variety of photoresists with different refractive indices.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A method of fabricating a lensed array comprising:
   inserting a fiber array that comprises optical fibers into channels of a glass substrate such that a portion of the fiber array is within the glass substrate and uncovered; and
   printing in situ a lens onto each optical fiber of the fiber array via two photon polymerization (TPP) using an ultrafast laser system to form a lensed array;
   wherein a pitch mismatch between the lensed array and the fiber array is less than 0.1 µm.

2. The method of claim 1, wherein the ultrafast laser system is operated at a wavelength ranging between 500 nm and 1000 nm, a pulse width ranging between 90 fs and 150 fs, and a repetition rate of between 15 MHz and 100 MHz.

3. The method of claim 2, wherein the ultrafast laser system is operated at a wavelength of 780 nm, a pulse width of 120 fs, and a repetition rate of 80 MHz.

4. The method of claim 1, wherein the fiber array is a two dimensional fiber array.

5. The method of claim 1, further including cleaving each optical fiber of the fiber array at an angle ranging between 0° and 8° relative to a plane perpendicular to a central axis of the optical fiber, wherein the angle has an angle variation of about 0.5°.

6. The method of claim 1, further including printing a coating on each of the lenses, wherein the coating is selected from the group consisting of: acrylic-based resists, epoxy based resists, and positive and negative resists.

7. The method of claim 1, further comprising splicing a coreless fiber onto each optical fiber of the fiber array prior to printing the lens on the optical fiber.

8. The method of claim 2, wherein the ultrafast laser system is operated at a wavelength of 800 nm, a pulse width of 300 fs, and a repetition rate of 80 MHz.

9. The method of claim 1, further comprising:
   for each of the inserted optical fibers, prior to the printing in situ the lens, determining the shape of the lens based on a pointing angle of the inserted optical fiber within the glass substrate relative to a reference fiber of the fiber array.

10. The method of claim 9, wherein the pitch mismatch between the lensed array and the fiber array is between 0.05 nm and 0.1 µm.

11. The method of claim 9, wherein the lensed optical connector has an angular misalignment ranging between 0.1° and 0.5° when coupled to another lensed optical connector.

12. A lensed optical fiber connector formed by the method comprising:
   inserting a fiber array that comprises optical fibers into channels of a glass substrate such that a portion of the fiber array is within the glass substrate and uncovered; and
   printing in situ a lens onto each optical fiber of the fiber array via two photon polymerization (TPP) using an ultrafast laser system to form a lensed array;
   wherein the lensed optical fiber includes a coreless fiber spliced onto the optical fiber, wherein the coreless fiber is positioned between the lens and the at least one optical fiber;
   wherein the lens has a height ranging between 10 µm and 600 µm relative to end faces of the optical fibers;
   wherein the lensed array and the fiber array have a pitch mismatch of between 0.05 nm and 0.1 µm; and wherein the lensed optical fiber connector has an angular misalignment is less than 0.01° when coupled to another lensed optical fiber connector.

13. The lensed optical fiber connector of claim 12, wherein the fiber array is a two dimensional fiber array.

14. The lensed optical fiber connector of claim 12, wherein the lens includes a resin selected from the group consisting of: acrylic-based resists, epoxy based resists, and positive and negative resists.

15. The lensed optical fiber connector of claim 12, further comprising a coating printed on each lens of the lens array, wherein the coating is selected from the group consisting of: acrylic-based resists, epoxy based resists, and positive and negative resists.

16. The lensed optical fiber connector of claim 12, wherein each optical fiber of the fiber array is cleaved at an angle ranging between 0° and 8° relative to a plane perpendicular to a central axis of the optical fiber, wherein the angle has an angle variation of about 0.5°.

* * * * *